United States Patent
Garwood et al.

(10) Patent No.: US 7,237,658 B2
(45) Date of Patent: Jul. 3, 2007

(54) FRICTIONAL BRAKE MECHANISM

(75) Inventors: Clint Garwood, Chicago, IL (US); Tracy H. Tepper, Chicago, IL (US)

(73) Assignee: Hydro Blade, Inc., Bloomingdale, IL (US)

( * ) Notice: Subject to any disclaimer, the term of this patent is extended or adjusted under 35 U.S.C. 154(b) by 0 days.

(21) Appl. No.: 10/905,257

(22) Filed: Dec. 22, 2004

(65) Prior Publication Data

US 2006/0131114 A1   Jun. 22, 2006

(51) Int. Cl.
F16D 55/26 (2006.01)

(52) U.S. Cl. .................. 188/72.6; 188/72.3; 188/106 F

(58) Field of Classification Search .. 188/24.11–24.22, 188/71.1–72.8, 170–173, 106 F
See application file for complete search history.

(56) References Cited

U.S. PATENT DOCUMENTS

| | | | | |
|---|---|---|---|---|
| 4,108,284 A | * | 8/1978 | Harrison | 188/59 |
| 4,174,025 A | * | 11/1979 | Ivachev | 188/72.6 |
| 4,213,519 A | * | 7/1980 | Moser et al. | 188/71.4 |
| 4,391,352 A | * | 7/1983 | Brown | 188/24.12 |
| 4,842,102 A | * | 6/1989 | Tateyama et al. | 188/24.21 |
| 2004/0144600 A1 | * | 7/2004 | Ikegami et al. | 188/2 F |

OTHER PUBLICATIONS

International Search Report.

* cited by examiner

Primary Examiner—Christopher P. Schwartz
(74) Attorney, Agent, or Firm—Seyfarth Shaw LLP

(57) ABSTRACT

A frictional brake mechanism for detaining a first body relative to a second body having a surface, comprising a brake pad coupled to the first body and disposed adjacent to the surface and movable to and from a braking condition, wherein the brake pad frictionally engages the surface, and a non-braking condition, wherein the brake pad is disposed in a spaced relation to the surface; a biasing structure for biasing the brake pad to the braking condition; a release structure operably coupled to the brake pad and movable to and from a non-release position, wherein the brake pad is biasable to the braking condition, and a release position, wherein the brake pad is disposed substantially in the non-braking condition; and a release key in operable communication with the release structure and movable to and from first and second positions relative thereto, wherein when the key is disposed in either of the first or second positions, the release structure is disposed substantially in the release position and when the key is disposed between the first and second positions, the release structure is disposed in the non-release position.

16 Claims, 3 Drawing Sheets

FRICTIONAL BRAKE MECHANISM

BACKGROUND OF THE INVENTION

The present application relates generally to frictional brake mechanisms, and, more particularly, to frictional brake mechanisms that detentably detain the movement of a first body relative to a second body.

When a first body must be detained relative to a second body, some form of brake mechanism, either frictional or mechanical, must engage the second body. Such mechanisms are generally mechanically or manually set to the detaining condition, wherein the first body is detained, or a non-detaining condition, wherein the first body is not detained.

There is a need for a frictional brake mechanism which is biased to a detaining condition and which can be disengaged to the non-detaining condition with a force that is substantially co-planar with the desired directional movement of the first body relative to the second body.

SUMMARY OF THE INVENTION

The present application discloses a frictional brake mechanism that detentably detains the movement of a first body relative to a second body and which is capable of being released when a force having a magnitude is applied to a release key. Accordingly, the first body is temporarily detained relative to the second body by the frictional brake mechanism.

The frictional brake mechanism of the present application includes a brake pad coupled to the first body and disposed adjacent to a surface of the second body and movable to and from a braking condition, wherein the brake pad frictionally engages the surface, and a non-braking condition, wherein the brake pad is disposed in a spaced relation to the surface. The frictional brake mechanism further includes a biasing structure for biasing the brake pad to the braking condition and a release structure operably coupled to the brake pad and movable to and from a non-release position, wherein the brake pad is biasable to the braking condition, and a release position, wherein the brake pad is disposed substantially in the non-braking condition. The release structure is actuated via a release key that is in operable communication with the release structure and movable to and from first and second positions relative thereto, wherein when the key is disposed in either of the first or second positions, the release structure is disposed substantially in the release position and when the key is disposed between the first and second positions, the release structure is disposed in the non-release position.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
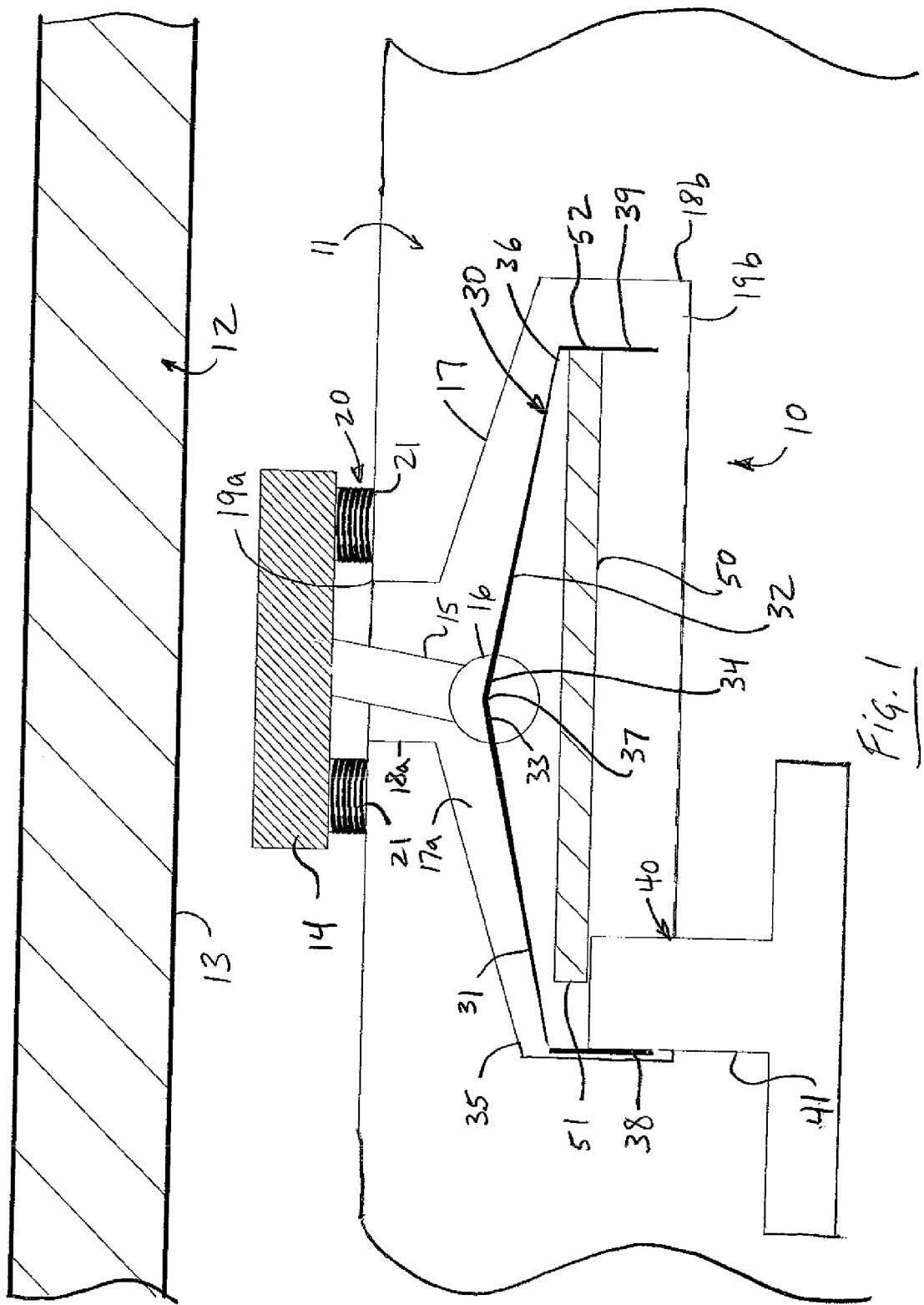
FIG. 1 is a cross-sectional side view of the brake mechanism of the present application with the key disposed in the first position.

Referring to the Figures, an embodiment of the frictional brake mechanism of the present application, generally referred to as numeral 10, is shown. In an embodiment, the brake mechanism 10 is adapted to detentably detain or control the relative movement between a first body 11 and a second body 12 having a surface 13. It will be understood and appreciated that the first body 111 can move relative to the second body 12, the second body 12 can move relative to the first body 11, or both the first and second bodies 11, 12 can move relative to each, without changing the scope or spirit of the present application.

Figure 2:
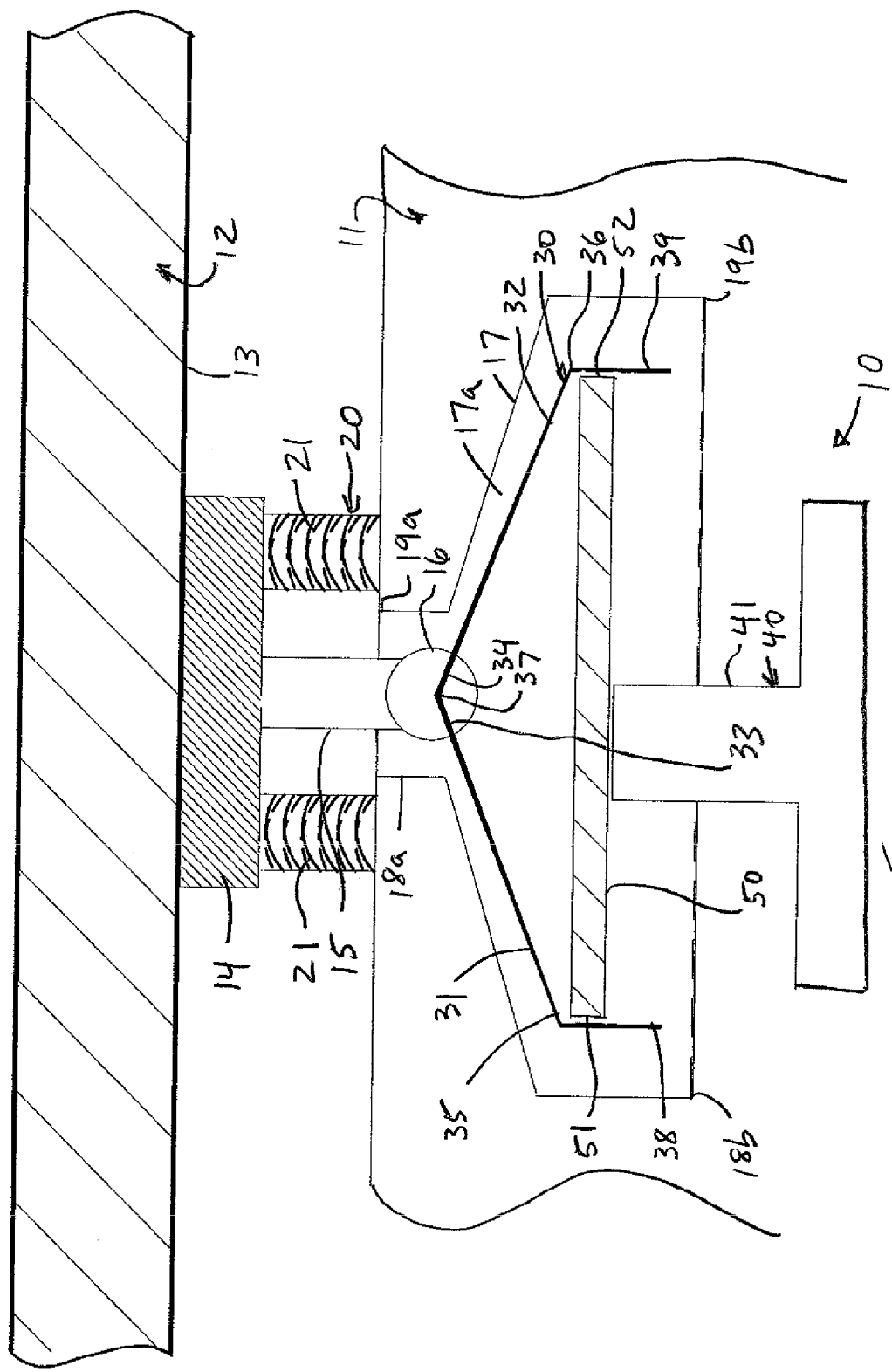
FIG. 2 is a view similar to FIG. 1, but with the key disposed between the first and second positions.
Figure 3:
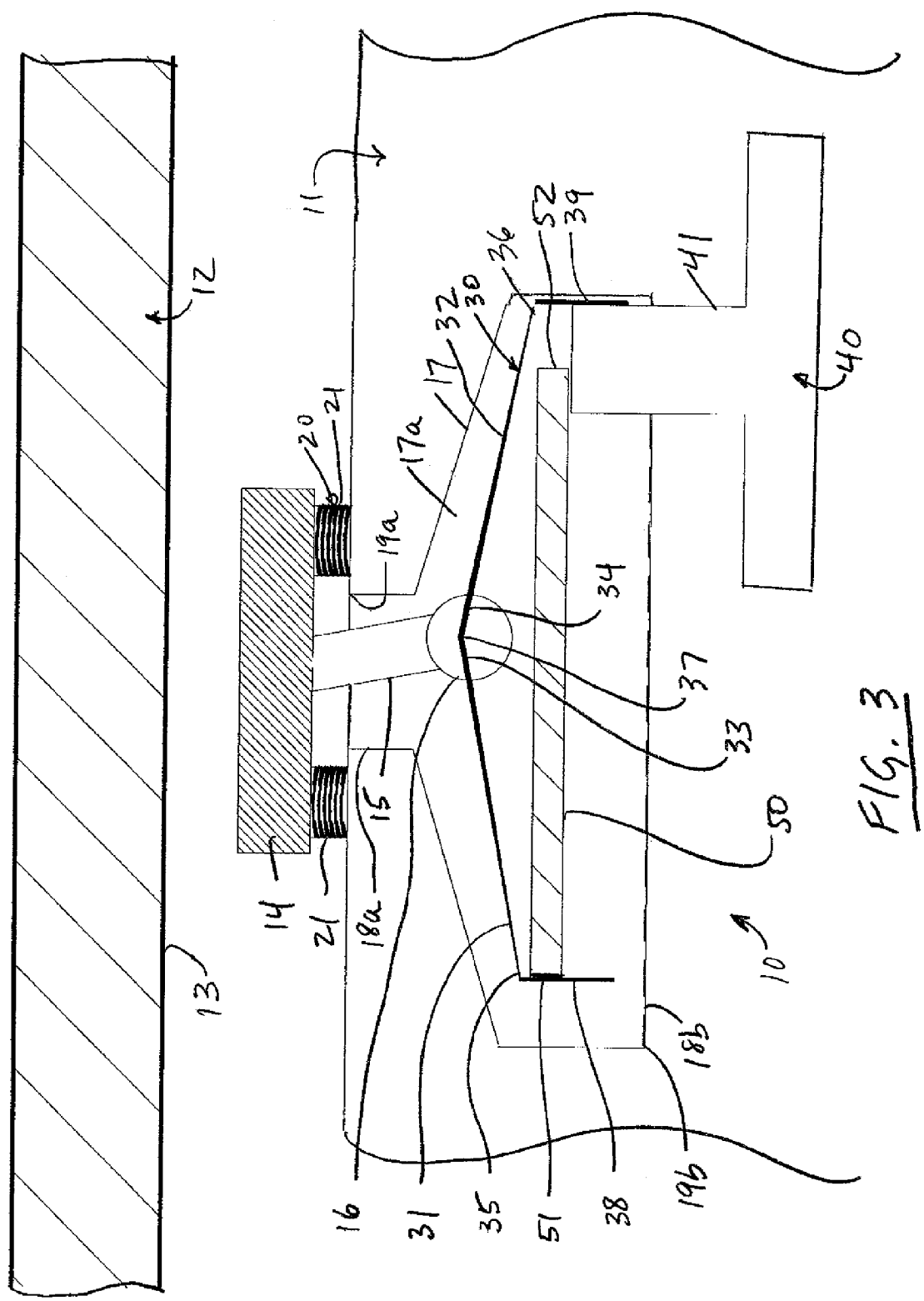
FIG. 3 is a view similar to FIG. 2, but with the key disposed in the second position.

In an embodiment, the brake mechanism 10 is coupled to the first body 11 and includes a frictional brake pad 14 disposed adjacent to the surface 13 of the second body 12. In an embodiment, the brake mechanism 10 can be coupled to the second body 12 wherein the brake pad 14 is adapted to engage the first body 11. The brake pad 14 is movable to and from a braking condition, wherein the brake pad 14 frictionally engages the surface 13 (as seen in FIG. 2) and a non-braking condition wherein the brake pad 14 is disposed in a spaced relation to the surface 13 (as seen in FIGS. 1 and 3). The brake pad 14 can be constructed of any material, but preferably is constructed of a material that enhances the frictional interaction between the brake pad 14 and surface 13.

In an embodiment, the brake pad 14 includes a depending leg 15 pivotally coupled to a bottom side of the brake pad 14 that transversely opposes the side of the brake pad 14 that frictionally engages the surface 13.

The brake mechanism 10 may include a housing 17 defining a cavity 17a and having transversely opposing first and second sides 18a, 18b with respective first and second apertures 19a, 19b communicating with the cavity 17a, with the first aperture 19a disposed adjacent to the brake pad 14. The depending leg 15 may extend through the first aperture 19a into cavity 17a.

In an embodiment, the brake mechanism 10 includes a biasing structure 20 for biasing the brake pad 14 to the braking condition. In an embodiment, the biasing structure 20 includes a compression spring 21 that is disposed on a bottom side of the brake pad 14 between the bottom side and the first side 18a of the housing 18 adjacent to the first aperture 19a. In another embodiment, the biasing structure 20 includes a plurality of compression springs 21.

The brake mechanism 10 also includes a release structure 30 that is operably coupled to the brake pad 14. The release structure 30 may be generally pliable. In an embodiment, the release structure 30 is pivotally coupled the leg 15 with a pivotal joint 16. The release structure 30 may be disposed in the cavity 17a and operably coupled to the brake pad 14 through the first aperture 19a with leg 15. The release structure 30 is movable to and from a non-release position, wherein the brake pad 14 is biasable to the braking condition (as seen in FIGS. 1 and 3), and a release position, wherein the brake pad 14 is disposed substantially in the non-braking condition (as seen in FIG. 2). Accordingly, it will be appreciated that the position of the release structure 30 controls the positional condition of the brake pad 14. In an embodiment, the release structure 30 is formed of a pliable material and is pliably bendable to and from the release and non-release positions.

The release structure 30 may include first and second arms 31, 32 having proximal ends 33, 34 and distal ends 35, 36. The arms 31, 32 may be pliably coupled to each other at the proximal ends 33, 34 to cooperatively define a pliable joint 37 that is pivotally coupled to the leg 15 with pivotal joint 16.

The first and second arms 31, 32 may further respectively include first and second feet 38, 39 respectively disposed at the distal ends 35, 36 and extending therefrom.

The brake mechanism 10 further includes a release key 40 that is in operable communication with the release structure 30. The release key 40 is movable to and from first and second positions, relative to the release structure 30. The release key 40 may be slidably disposed in the second aperture 19b and slidable to and from the first and second positions. When the release key 40 is disposed in either of the first or second positions, the release structure 30 is disposed substantially in the release position (as seen in FIGS. 1 and 3). When the release key 40 is disposed between the first and second positions, the release structure 30 is disposed substantially in the non-release position (as seen in FIG. 2). Accordingly, it will be appreciated that the position of the release key 40, relative to the release structure 30, controls the position of the release structure 30.

In an embodiment, the release key 40 includes a tang 41, which cooperatively engages the first and second feet 38, 39 for positional movement of the release structure 30.

The brake mechanism 10 also includes a brace structure 50 that is disposed between the first and second feet 38, 39 adjacent to the tang 41. The brace structure 50 has a length that is less than the distance between the first and second feet 38, 39. The brace structure 50 includes a first edge 51 that is disposed adjacent to the first foot 38 and a second edge 52 that is disposed adjacent to the second foot 39.

When the tang 41 is disposed in the first position with a force generally directed towards the first position, the tang 41 forcefully abuts the first foot 38, thereby moving the release structure 30 towards the first position, relative to the brace structure 50, until the second foot 39 abuts the second edge 52 of the brace structure 50 (as seen in FIG. 1). Continued forceful abutment causes the first and second arms 31, 32 to pliably bend at the pliable joint 16 towards the brace structure 50, thereby disposing the release structure 30 in the release position and the brake pad 14 in the non-braking condition through relative movement of leg 15.

When the tang 41 is disposed in the second position with a force generally directed towards the second position, the tang 41 forcefully abuts the second foot 39, thereby moving the release structure 30 towards the second position, relative to the brace structure 50, until the first foot 38 abuts the first edge 51 of brace structure 50 (as seen in FIG. 3). Continued forceful abutment also causes the first and second arms 31, 32 to pliably bend at the pliable joint 16 towards the brace structure 50, thereby disposing the release structure 30 in the release position and the brake pad 14 in the non-braking condition.

Accordingly, it will be appreciated that a force applied to the release key 40, which may be substantially co-planar with the desired directional movement of the first body 11 relative to the second body 12, thus causing the release key 40 to move relative to the first body 11, causes positional actuation of the release key 40 to and from the first and second positions. When the release key 40 is in either of the first or second positions, the release structure 30 is disposed in the release position, wherein the brake pad 14 is disposed substantially in the non-braking condition. When the release key 40 is disposed between the first and second positions, the release structure 30 is disposed in the non-release position, wherein the brake pad 14 is disposed in the braking condition. As such, movement of the release key 40, relative to the first body 11, controls the position of the release structure 30, which in turn controls the positional condition of the brake pad 14.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A frictional brake mechanism for detaining a first body relative to a second body having a surface, comprising:
   a brake pad coupled to the first body and disposed adjacent to the surface and movable to and from a braking condition, wherein the brake pad frictionally engages the surface, and a non-braking condition, wherein the brake pad is disposed in a spaced relation to the surface;
   a biasing structure for biasing the brake pad to the braking condition;
   a release structure operably coupled to the brake pad and movable to and from a non-release position, wherein the brake pad is biasable to the braking condition, and a release position, wherein the brake pad is disposed substantially in the non-braking condition; and
   a release key in operable communication with the release structure and movable to and from first and second positions relative thereto, wherein when the key is disposed in either of the first or second positions, the release structure is disposed substantially in the release position and when the key is disposed between the first and second positions, the release structure is disposed in the non-release position.

2. The frictional brake mechanism as claimed in claim 1 wherein the biasing structure includes a compression spring disposed on a bottom of the brake pad.

3. The frictional brake mechanism as claimed in claim 1 wherein the brake pad includes a depending leg on a bottom side thereof.

4. The frictional brake mechanism as claimed in claim 3 wherein the release structure is pivotally coupled to the leg.

5. The frictional brake mechanism as claimed in claim 1 wherein the release structure is formed of a pliable material and is pliably bendable between the release and non-release positions.

6. The frictional brake mechanism as claimed in claim 5 wherein the release structure includes first and second arms having proximal and distal ends, the arms being pliably coupled to each other at the proximal ends to cooperatively define a pliable joint that is pivotally coupled to the leg.

7. The frictional brake mechanism as claimed in claim 6 wherein the first and second arms respectively have first and second feet disposed at the distal ends thereof and extending therefrom for cooperative engagement with the key.

8. The frictional brake mechanism as claimed in claim 7 further comprising a brace structure disposed between the first and second feet adjacent to the key, the brace structure having a length less than a distance between the first and second feet and a first edge disposed adjacent to the first foot and a second edge disposed adjacent to the second foot, wherein when the key is disposed in the first position, the key forcefully abuts the first foot, thereby moving the release structure towards the first position, relative to the brace structure, until the second foot abuts the second edge of the brace structure, thus causing the first and second arms to bend at the pliable joint towards the brace structure, and thereby disposing the release structure in the release position, and wherein when the key is disposed in the second position, the key forcefully abuts the second foot, thereby moving the release structure towards the second position, relative to the brace structure, until the first foot abuts the first edge of the brace structure, thus causing the first and second arms to bend at the pliable joint towards the brace structure, thereby disposing the release structure in the release position.

9. A frictional brake mechanism for detaining the movement of a first body relative to a second body having a surface, comprising:
- a housing defining a cavity coupled to the first body and having first and second sides with respective first and second apertures communicating with the cavity, the first aperture disposed adjacent to the surface;
- a brake pad disposed adjacent to the surface and movable to and from a braking condition, wherein the brake pad frictionally engages the surface, and a non-braking condition, wherein the brake pad is disposed in a spaced relation to the surface;
- a biasing structure for biasing the brake pad to the braking condition;
- a pliable release structure disposed in the cavity and operably coupled to the brake pad and being bendable between a non-release position, wherein the brake pad is biasable to the braking condition, and a release position, wherein the brake pad is disposed substantially in the non-braking condition; and
- a release key slidably disposed in the second aperture and being slidable to and from first and second positions relative to the release structure, wherein when the key is disposed in either of the first or second positions, the release structure is bent to the release position and when the key is disposed between the first and second positions, the release structure is disposed in the non-release position.

10. The frictional brake mechanism as claimed in claim 9 wherein the biasing structure includes a compression spring disposed between a bottom side of the brake pad and the housing adjacent to the first aperture.

11. The frictional brake mechanism as claimed in claim 9 wherein the brake pad includes a depending leg on a bottom side thereof.

12. The frictional brake mechanism as claimed in claim 11 wherein the release structure is pivotally coupled to the leg.

13. The frictional brake mechanism as claimed in claim 12 wherein the release structure includes first and second arms having proximal and distal ends, the arms being pliably coupled to each other at the proximal ends to cooperatively define a pliable joint that is pivotally coupled to the leg.

14. The frictional brake mechanism as claimed in claim 13 wherein the first and second arms respectively have first and second feet disposed at the distal ends thereof and extending therefrom for cooperative engagement with the key.

15. The frictional brake mechanism as claimed in claim 14 further comprising a brace structure disposed between the first and second feet adjacent to the key, the brace structure having a length less than a distance between the first and second feet and a first edge disposed adjacent to the first foot and a second edge disposed adjacent to the second foot, wherein when the key is disposed in the first position, the key forcefully abuts the first foot, thereby moving the release structure towards the first position, relative to the brace structure, until the second foot abuts the second edge of the brace structure, thus causing the first and second arms to bend at the pliable joint towards the brace structure, thereby disposing the release structure in the release position, and wherein when the key is disposed in the second position, the key forcefully abuts the second foot, thereby moving the release structure towards the second position, relative to the brace structure, thus causing the first and second arms to bend at the pliable joint towards the brace structure, thereby disposing the release structure in the release position.

16. A frictional brake mechanism for detaining the movement of a first body relative to a second body having a surface, comprising:
- a brake pad disposed adjacent to the surface and movable to and from a braking condition, wherein the brake pad frictionally engages the surface, and a non-braking condition, wherein the brake pad is disposed in a spaced relation to the surface;
- a biasing structure for biasing the brake pad to the braking condition; and
- a means for moving the brake pad to the non-braking condition including a pliable release structure operably coupled to the brake pad and being bendable to and from a non-release position, wherein the brake pad is biasable to the braking condition, and a release position, wherein the brake pad is disposed substantially in the non-braking condition, and a release key slidably disposed in the second aperture and being slidable to and from first and second positions relative to the release structure, wherein when the key is disposed in either of the first or second positions, the release structure is bent to the release position and when the key is disposed between the first and second positions, the release structure is disposed in the non-release position.

* * * * *